(12) United States Patent
Oikawa

(10) Patent No.: US 12,411,602 B2
(45) Date of Patent: Sep. 9, 2025

(54) MEMORY SYSTEM

(71) Applicant: Kioxia Corporation, Tokyo (JP)

(72) Inventor: Kohei Oikawa, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/178,472

(22) Filed: Mar. 3, 2023

(65) Prior Publication Data

US 2024/0004549 A1    Jan. 4, 2024

(30) Foreign Application Priority Data

Jul. 1, 2022  (JP) ................... 2022-106782

(51) Int. Cl.
*G06F 3/06* (2006.01)

(52) U.S. Cl.
CPC .......... *G06F 3/0608* (2013.01); *G06F 3/0656* (2013.01); *G06F 3/0679* (2013.01)

(58) Field of Classification Search
CPC .... G06F 3/0608; G06F 3/0656; G06F 3/0679; G06F 2212/1016; G06F 2212/7201; G06F 2212/7203; G06F 12/0246; G06F 3/061
See application file for complete search history.

(56) References Cited

U.S. PATENT DOCUMENTS

| | | |
|---|---|---|
| 6,125,392 A | 9/2000 | Labatte et al. |
| 8,745,313 B2 | 6/2014 | Yano et al. |
| 9,047,177 B2 | 6/2015 | Matsudaira et al. |
| 10,394,480 B2 | 8/2019 | Tsuruya et al. |
| 2010/0058007 A1 | 3/2010 | Yamauchi |
| 2015/0071003 A1* | 3/2015 | Numata ............... G11C 7/1087 365/185.18 |
| 2019/0138446 A1* | 5/2019 | Lyer .................... G06F 12/0886 |
| 2020/0242021 A1* | 7/2020 | Gholamipour ...... G06F 11/1456 |
| 2023/0107227 A1* | 4/2023 | Tan ..................... G06F 12/0246 711/154 |
| 2023/0367705 A1* | 11/2023 | Cariello ............. G06F 12/0246 |
| 2023/0409231 A1* | 12/2023 | Gaskill ................ G06F 3/0655 |

FOREIGN PATENT DOCUMENTS

| | | |
|---|---|---|
| JP | 4675985 B2 | 4/2011 |
| JP | 2013-196115 A | 9/2013 |
| JP | 6430039 B2 | 11/2018 |

* cited by examiner

*Primary Examiner* — Jason W Blust
(74) *Attorney, Agent, or Firm* — Kim & Stewart LLP

(57) ABSTRACT

A memory system includes a non-volatile memory, a buffer memory, and a controller configured to write data to the non-volatile memory in write units of a predefined size, each write unit including a plurality of data items and log data and to temporarily store the data items and the log data of each write unit in the buffer memory prior to writing the write unit to the non-volatile memory. In response to a write command, the controller calculates a total data size of the data items of the write unit and write data specified in the write command, and a total log size of the log data and log information associated with the write data, and in response to determining that the total data size or the total log size is greater than their respective thresholds, writes the write unit stored in the buffer memory to the non-volatile memory.

15 Claims, 14 Drawing Sheets

FIG. 4

| LOGICAL ADDRESS | PHYSICAL ADDRESS |
|---|---|
| 6 | 2000 |
| 7 | 2001 |
| 8 | 2002 |
| 9 | 2003 |
| 100 | 2004 |
| 101 | 2005 |
| 202 | 2006 |
| 203 | 2007 |
| 204 | 2008 |
| 205 | 2009 |
| 102 | 2010 |
| 103 | 2011 |
| 104 | 2012 |
| ⋮ | ⋮ |
| 302 | 2063 |

LUT

| PHYSICAL OFFSET | LOGICAL ADDRESS |
|---|---|
| 0 | 6 |
| 1 | 7 |
| 2 | 8 |
| 3 | 9 |
| 4 | 100 |
| 5 | 101 |
| 6 | 202 |
| 7 | 203 |
| 8 | 204 |
| 9 | 205 |
| 10 | 102 |
| 11 | 103 |
| 12 | 104 |
| ⋮ | ⋮ |
| 62 | 302 |

LG

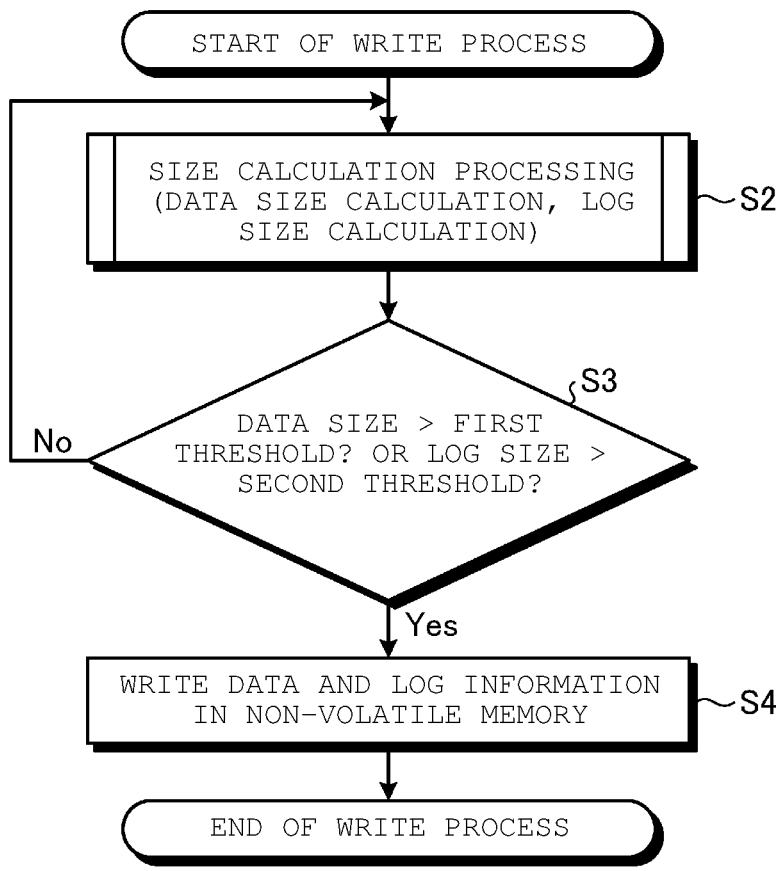
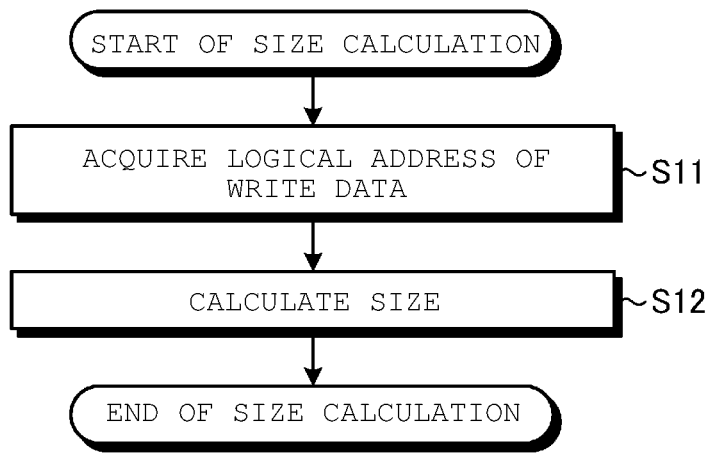

US 12,411,602 B2

MEMORY SYSTEM

CROSS-REFERENCE TO RELATED APPLICATION

This application is based upon and claims the benefit of priority from Japanese Patent Application No. 2022-106782, filed Jul. 1, 2022, the entire contents of which are incorporated herein by reference.

FIELD

Embodiments described herein relate generally to a memory system.

BACKGROUND

A memory system with a non-volatile memory can store data and log information thereof in the non-volatile memory. In the memory system, it is desired to improve the usage efficiency of the non-volatile memory.

DESCRIPTION OF THE DRAWINGS

FIG. 4 is a diagram showing a configuration of address translation information in the first embodiment.

FIG. 7 is a flowchart showing a write process in the first embodiment.

FIG. 8 is a flowchart showing size calculation processing in the first embodiment.

DETAILED DESCRIPTION

Embodiments provide a memory system that can improve the usage efficiency of a non-volatile memory.

In general, according to one embodiment, there is provided a memory system including a non-volatile memory, a buffer memory, and a controller configured to write data to the non-volatile memory in write units of a predefined size, each write unit including a plurality of data items and log data for the write unit. The controller is further configured to temporarily store the data items and the log data of each write unit in the buffer memory prior to writing the write unit to the non-volatile memory, and in response to a write command, store write data specified in the write command and log information associated with the write data in the buffer memory, calculate a total data size by adding a data size of the write data to a data size of the data items in the write unit temporarily stored in the buffer memory and a total log size by adding a data size of the log information to a data size of the log data in the write unit temporarily stored in the buffer memory, and in response to determining that either the total data size is greater than a first threshold or the total log size is greater than a second threshold, write the write unit temporarily stored in the buffer memory to the non-volatile memory.

The memory system according to the embodiments will be described in detail below with reference to the accompanying drawings. In addition, the scope of the present disclosure is not limited by these embodiments.

First Embodiment

Figure 1:
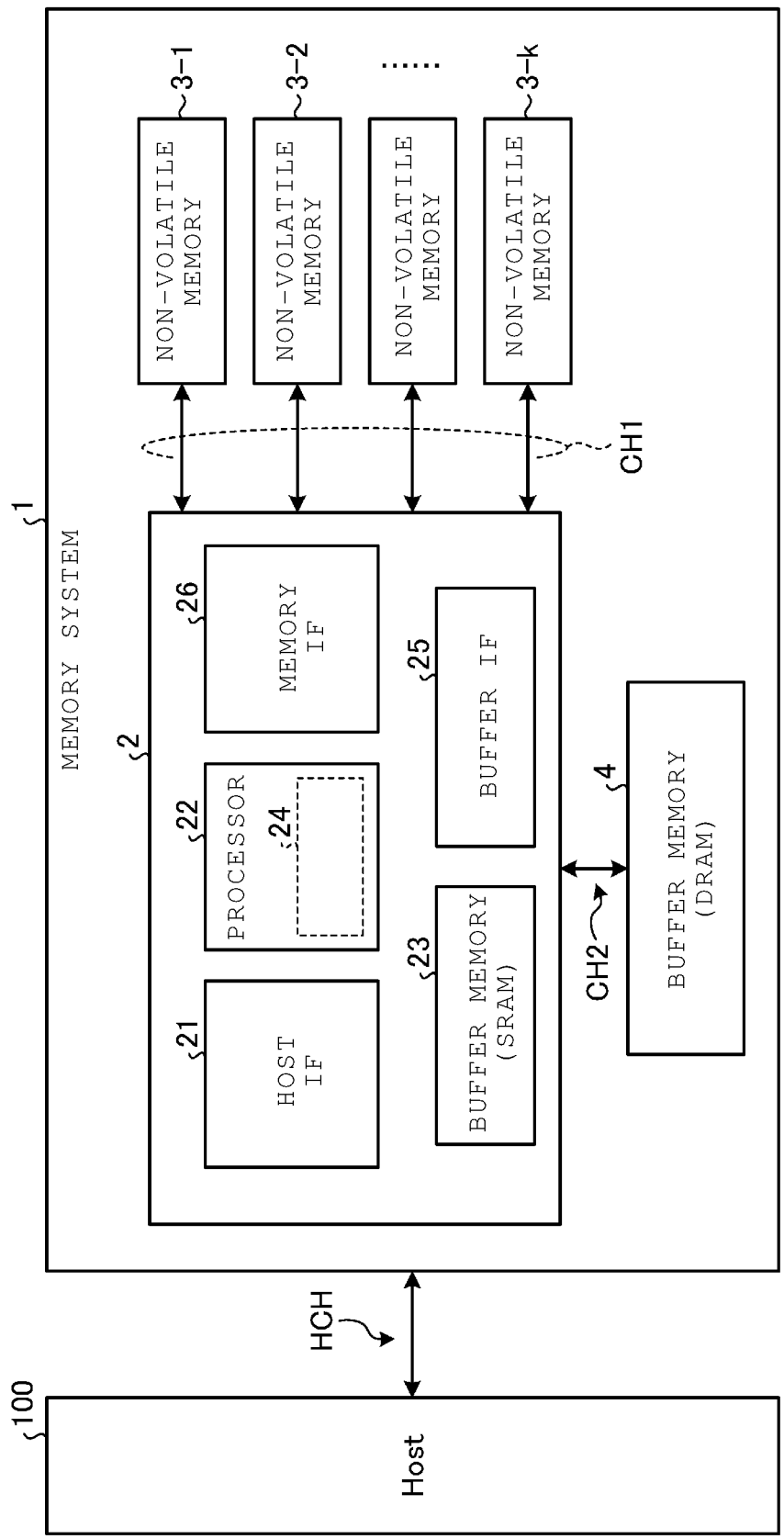
FIG. 1 is a diagram showing a configuration of a memory system according to a first embodiment.

A memory system according to a first embodiment includes a non-volatile memory and can store data and log information thereof in the non-volatile memory. The memory system according to the first embodiment, which is depicted in FIG. 1 as a memory system 1, improves the usage efficiency of the non-volatile memory.

The memory system 1 can be connected to a host 100 via a host channel HCH and can function as a storage medium for the host 100. The memory system 1 is, for example, a solid state drive (SSD). The host 100 may be a terminal such as a personal computer or may be the CPU of the terminal. The host channel HCH may be a wired communication path.

The memory system 1 includes a controller 2, a plurality of non-volatile memories 3-1 to 3-k (k is any integer greater than or equal to 2), and a buffer memory 4. The controller 2 can be connected to the host 100 via the host channel HCH. The controller 2 is connected to the plurality of non-volatile memories 3-1 to 3-k via a channel CH1. The channel CH1 includes a plurality of signal lines. The controller 2 is connected to the buffer memory 4 via a channel CH2. The channel CH2 includes one or more signal lines.

The controller 2 comprehensively controls each part of the memory system 1. The controller 2 may be implemented as a controller package including, for example, a system-on-a-chip (SoC). The controller 2 includes a host interface (host IF) 21, a processor 22, a buffer memory 23, a buffer interface (buffer IF) 25, and a memory interface (memory IF) 26.

The host interface 21 can be connected to the host 100 via the host channel HCH. The host interface 21 receives command data from the host 100 and transmits response data to the host 100.

The processor 22 comprehensively controls each part of the controller 2. The processor 22 may be implemented as a central processing unit (CPU) or the like. The processor 22 controls a write process for writing data to the non-volatile memory 3 according to write commands received by the host interface 21. The processor 22 controls a read process for reading data from the non-volatile memory 3 according to read commands received by the host interface 21.

The buffer memory 23 is, for example, a volatile memory such as a static random access memory (SRAM) and can be used as a working area by the controller 2. The buffer memory 23 temporarily stores data related to the write process and the read process, temporarily stores data for an internal process such as compaction, and temporarily stores management information such as address translation information.

The buffer interface 25 performs interface operations with respect to the buffer memory 4 under the control by the processor 22. Data related to the write process and the read process, data for the internal process such as compaction, management information such as address translation information, and the like can be transferred between the buffer interface 25 and the buffer memory 4.

The controller 2 includes a compression and decompression function 24. The compression and decompression function 24 may be implemented in hardware, and as shown in FIG. 1, may be implemented in software that is executed by the processor 24. It may also be partially implemented in hardware and the others in software. When implemented in hardware, the compression and decompression function 24 may be implemented as a circuit. When implemented in software, the compression and decompression function 24 may be implemented as a function module loaded into the buffer memory 23 collectively at the time of compilation or sequentially according to the progress of processing according to the execution of the program by the processor 22. The program contains compression algorithms.

Any lossless compression method may be used as the compression algorithm. As the compression algorithm, a general-purpose standard such as ZIP may be used, or a dedicated algorithm may be used. Dedicated algorithms include, for example, Lempel-Ziv (LZ77, LZ78, and the like), Deflate, or various other lexicographic compressions, block sort-based encoding (for example, bzip2 and the like), and various entropy encodings.

The buffer memory 4 is, for example, a volatile memory such as a dynamic random access memory (DRAM) and can be used as a work area by the controller 2. The buffer memory 4 temporarily stores data related to the write process and the read process, temporarily stores data for the internal process such as compaction, and temporarily stores management information such as address translation information.

The memory interface 26 performs interface operations with respect to the non-volatile memory 3 under the control by the processor 22. Data related to the write process and the read process, data for the internal process such as compaction, management information such as address translation information, and the like can be transferred between the memory interface 26 and the non-volatile memory 3.

Each non-volatile memory 3 may be, for example, a NAND flash memory, a resistance random access memory (ReRAM), a phase change random access memory (PRAM), a magnetoresistive random access memory (MRAM), or a ferroelectric random access memory (FeRAM). In the following description, the case where each non-volatile memory 3 is a NAND flash memory will be mainly described.

Figure 2:
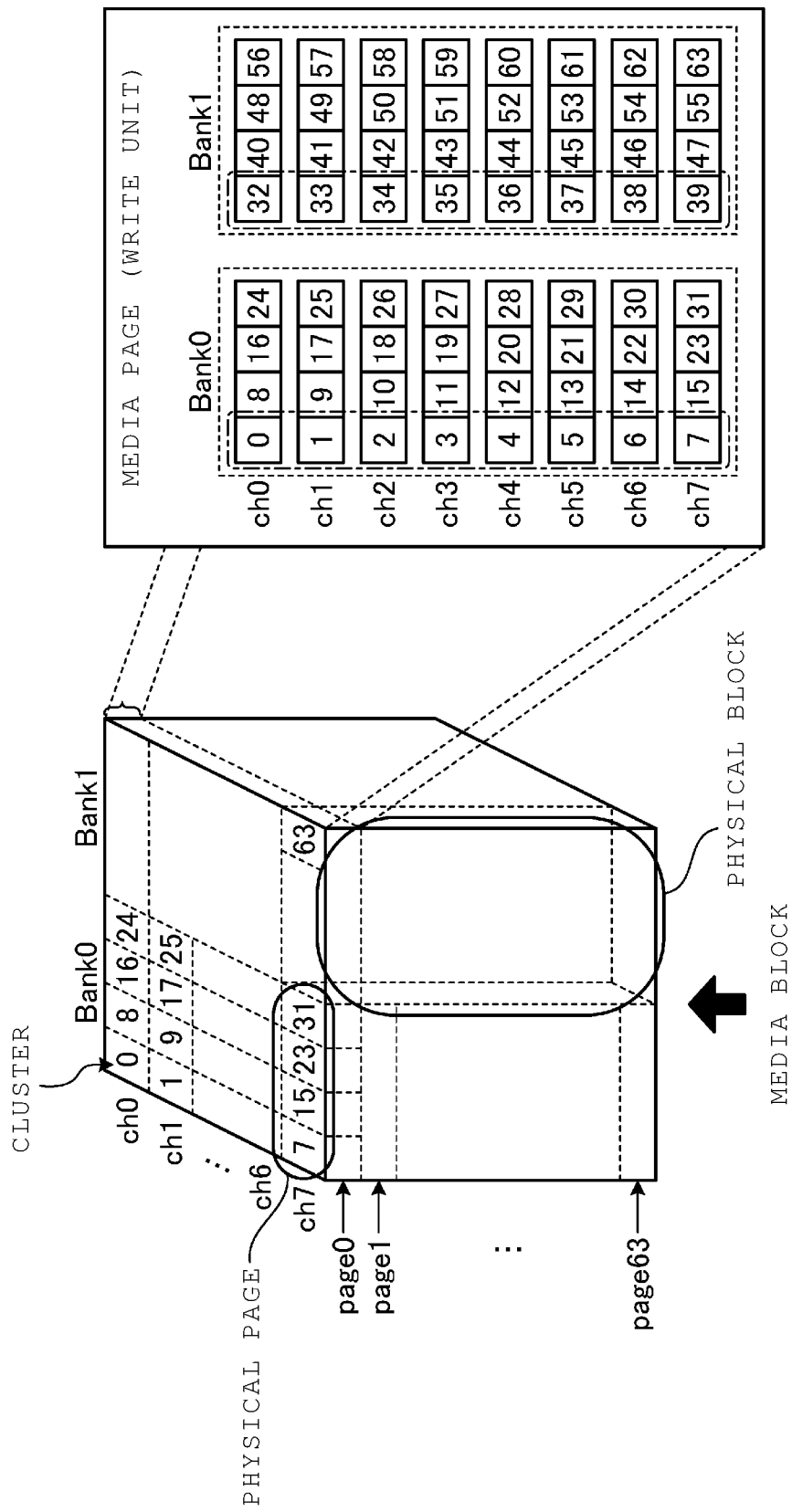
FIG. 2 is a diagram showing data management units in the first embodiment.

Data management units in the non-volatile memory 3 may be configured as shown in FIG. 2. FIG. 2 is a diagram showing the data management units in the non-volatile memory 3.

The non-volatile memory 3 may be configured with a plurality of memory chips. In each memory chip, a physical page is a unit of data write and read. A physical block is configured with a plurality of physical pages and is the minimum access unit in which data can be independently erased. Each physical block includes a plurality of memory cells. Each memory cell can store a plurality of values. When each memory cell in a memory cell group connected to the same word line in each physical block can store n-bit information, the memory cell group is treated as n physical pages.

It is assumed that data in the non-volatile memory 3 is managed by the controller 2 in a cluster, which is a data management unit smaller than one physical page. A cluster size is greater than or equal to the sector size, which is the minimum access unit from the host 100, and is determined so that the physical page size is a natural number multiple of the cluster size. For example, one physical page may include 4 clusters, and one media page may include 64 clusters.

In addition, the example shown in FIG. 2 illustrates a case where memory chips are connected to eight channels ch0 to ch7. The controller 2 can control each of the channels ch0 to ch7 in parallel. Further, the controller 2 can perform a plurality of parallel operations by bank interleaving for each of the channels ch0 to ch7. As a result, 16 physical pages that can be written or read in parallel and almost collectively can configure one media page, which is a data recording region, and 16 physical blocks that can be erased in parallel and almost collectively can configure one media block, which is a data block.

Here, a media page is a block of data corresponding to the data size that can be written in parallel and almost collectively, and a media page is referred to as a write unit. The write unit may include a plurality of pieces of user data and log information thereof. The write unit may be written with one write to the non-volatile memory 3 and include log information thereof, or may be written with a plurality of times of write to the non-volatile memory 3 and include log information thereof. The log information may be written to another physical location instead of a location in the write unit. In the following, a case where the write unit is written with one write to the non-volatile memory 3 and includes log information thereof will be mainly described.

Figure 3:
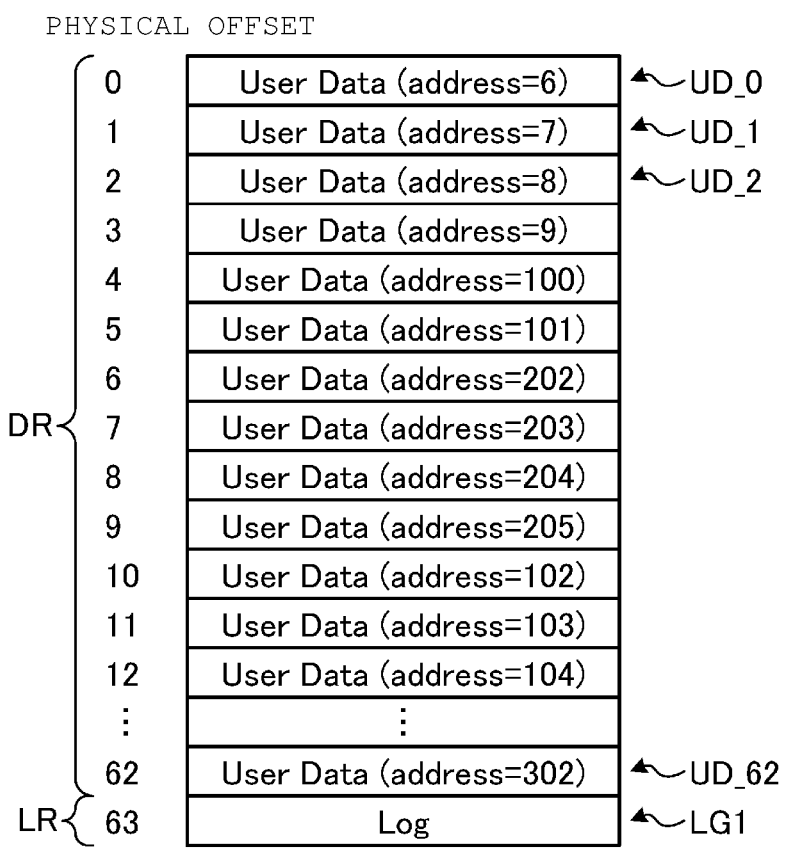
FIG. 3 is a diagram showing a configuration of a write unit in the first embodiment.

For example, 64 clusters surrounded by a dashed line in FIG. 2 can be written in parallel and almost collectively. Accordingly, the write unit may contain 64 entries, as shown in FIG. 3. The write unit has a size of 64 clusters. In the case of FIG. 3, 63 entries are allocated to user data and one entry is allocated to log information in the write unit. Hereinafter, the region allocated to user data in the write unit will be referred to as a data region DR, and the region allocated to log information will be referred to as a log region LR.

Here, the memory system 1 uses a recording medium such as the non-volatile memory 3 (for example, NAND flash memory) that physically cannot be partially updated (for example, updating data for each memory cell). For this reason, the memory system 1 performs compaction processing in which valid data is collected from a region where valid data and invalid data are mixed and moved to a physically continuous region. One method for implementing the compaction processing is a method that uses log information.

First, the compaction processing using the log information of the memory system according to a comparative example will be described. The configuration of the memory system according to the comparative example is the same as the configuration of the memory system 1 shown in FIG. 1. Similar to the memory system 1, the memory system according to the comparative example has management information for managing the user data as well as user data exchanged with the host 100. Among the management information, information related to compaction includes address translation information and log information. Similar to the memory system 1, also in the memory system according to the comparative example, log information is written to the non-volatile memory 3 together with the plurality of pieces of user data shown in FIG. 3.

As shown in FIG. 4, address translation information LUT is information in which a logical address LBA and a physical address MCA are correlated with each other for each predetermined entry (for example, each cluster). The address translation information LUT may be implemented in a table format. When implemented in the table format, the address translation information LUT is also referred to as a logical-to-physical address translation table.

Figure 5:
FIG. 5 is a diagram showing a configuration of log information in the first embodiment.

As shown in FIG. 5, log information LG is information in which physical offsets and logical addresses LBA are correlated with each other in chronological order for each predetermined entry (for example, each cluster). The physical offset indicates how much the written physical address MCA is offset from the first physical address. The log information LG records logical addresses of the plurality of pieces of user data in chronological order.

FIG. 5 illustrates the log information LG of a write range. For example, when the write range is as shown in FIG. 3, there are 63 pieces of user data, so the address translation information LUT of the write range can be a table with 63 entries as shown in FIG. 4. The log information LG of the write range can be a table with 63 entries as shown in FIG. 5.

For example, a case where the size of the write unit is constant and the number of entries in the write unit is fixed to a first number is considered. In this case, the controller 2 allocates a second number of entries to the user data and a third number of entries to the log information among the first number of entries in the write unit. The second number is the number obtained by subtracting the third number from the first number. For example, the first number, the second number, and the third number are 64, 63, and 1, respectively.

In the write process, the controller 2 of the memory system according to the comparative example first waits until the number of data entries reaches the second number. When the number of data entries reaches the second number, the controller 2 generates the third number of pieces of log information and writes the second number of pieces of data and the third number of pieces of log information as the write unit to the non-volatile memory 3.

In the memory system according to the comparative example, similar to the memory system 1, in the compaction processing using the log information LG, the controller 2 determines whether the user data to be moved is valid with reference to the address translation information LUT. The controller 2 determines that the user data is valid when the logical address LBA of the user data in the log information LG is registered in the address translation information LUT. The controller 2 determines that the user data is invalid when the logical address LBA of the user data in the log information LG is not registered in the address translation information LUT. Then, the controller 2 copies the user data determined to be valid to a new physical address MCA. After copying, the controller 2 updates the corresponding entry in the address translation information LUT with the new physical address MCA.

However, the controller 2 does not update the address translation information LUT when the physical address MCA recorded in the corresponding entry does not match the physical address MCA of the copy source data to be moved in the compaction processing. Not matching means that new user data was written from the host 100 during copying and the physical address MCA of the user data is updated. When control is performed so that a write operation is not executed during copying, the controller 2 may update the address translation information LUT regardless of whether the physical address MCA recorded in the corresponding entry matches the current physical address MCA of the copy source data.

In the memory system according to the comparative example, in a case where the physical location when writing the log information LG to the non-volatile memory 3 and the number of data entries provided in the log information LG can be unified, the compaction processing can be simplified, and the operation of the controller 2 can be speeded up. In a case where the physical location and the number of entries of the log information LG are fixed, an unused region in which data and information are not recorded in the write unit may occur. As a result, when the write unit is written to the non-volatile memory 3, the unused region may be occupied by invalid data, and the usage efficiency of the non-volatile memory 3 may decrease.

For example, it is assumed that the number of entries in the write unit is fixed to the first number (for example, 64 entries). The data region DR to which the user data UD is to be written in the write unit may be allocated with (second number)/(first number) of the data size of the write unit. For example, when the size of the write unit is 256 kB, the second number=63, and the first number=64, 256 kB×63/64=252 kB can be allocated to the data region DR.

The log region LR to which the third number of pieces of log information LG1 is to be written may be allocated with (third number)/(first number) of the data size of the write unit. For example, when the third number=1 and the first number=64, 256 kB×1/64=4 kB can be allocated to the log region LR.

Figure 6B:
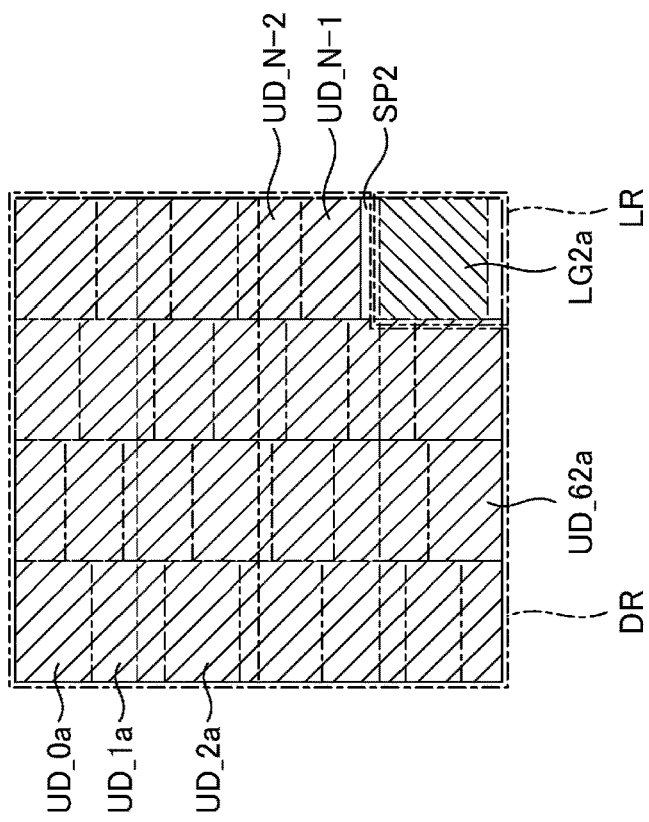
FIGS. 6A and 6B are diagrams showing locations of user data and log information in the write unit in the first embodiment.
Figure 6A:
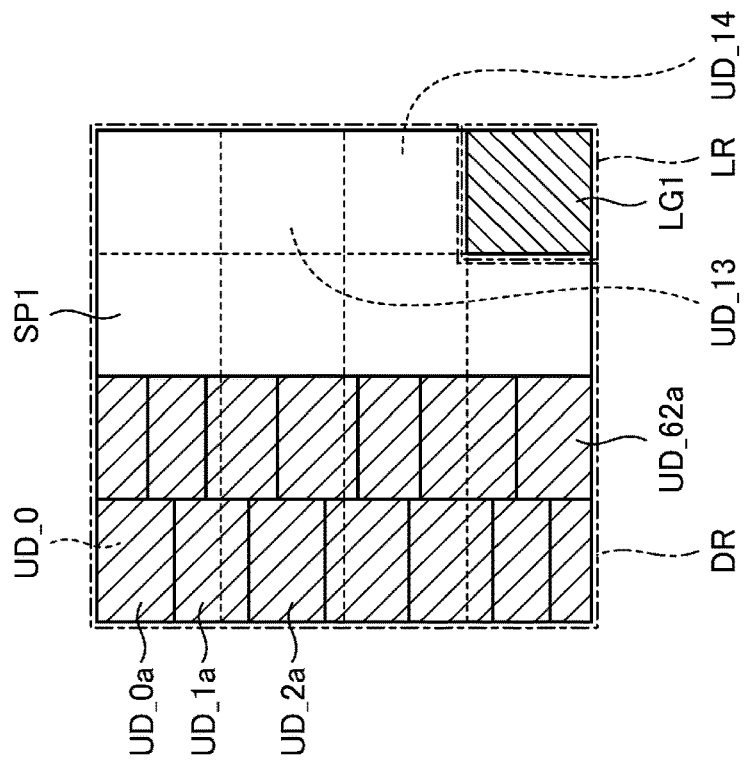

The history of the second number of pieces of user data UD is recorded in the log information LG1 (see FIG. 6A). As a result, the size of the log information LG1 can reach the size of the log region LR.

For example, when the user data received from the host 100 has a variable length, the sizes of the data UD_0a to UD_62a of the second number (for example, 63) of entries are written as shown by solid-line squares in FIG. 6A. The total size of the data UD_0a to UD_62a of the second number of entries can be smaller than the size of the data region DR. As a result, an unused region SP1 in which no user data is recorded is generated in the data region DR in the write unit.

Alternatively, when the controller 2 of the memory system according to the comparative example compresses the user data, the compressed sizes of the data UD_0a to UD_62a of the second number of entries can be smaller than those of the data UD_0 to UD_62 before compression, respectively, as shown by solid-line squares in FIG. 6A. The total size of the data UD_0a to UD_62a of the second number of entries can be smaller than the size of the data region DR. As a result, the unused region SP1 in which no user data is recorded is generated in the data region DR in the write unit.

Alternatively, when the user data received from the host 100 is compressed data, the sizes of the compressed data UD_0a to UD_62a of the second number of entries can be smaller than those of the data UD_0 to UD_62 before the compression, respectively, as shown by solid-line squares in FIG. 6A. The total size of the data UD_0a to UD_62a of the second number of entries can be smaller than the size of the data region DR. As a result, the unused region SP1 in which no user data is recorded is generated in the data region DR in the write unit.

For these reasons, the memory system 1 makes the number of entries in the write unit variable, compresses the log information LG, and includes the compressed log information LG in the write unit. For example, the memory system 1 keeps adding the data entries until the total size of the data UD (data size) exceeds the size of the data region DR or the size of the compressed log information LG (log size) exceeds the size of the log region LR. Then, the memory system 1 finishes adding the data entries immediately before the data size exceeds the size of the data region DR or immediately before the log size exceeds the size of the log region LR. As a result, as shown in FIG. 6B, a larger number of pieces of user data than the second number can be provided in the data region DR within the write unit, and the log information LG including the history of the larger number of pieces of user data than the second number can be provided in the log region LR in the write unit. In the case of FIG. 6B, the memory system 1 can include N pieces of user data UD_0a to UD_N-1 in the data region DR in the write unit, and the log information LG including the history of the N pieces of user data can be provided in the log region LR in the write unit. N is an integer greater than 63. When the write unit is written to the non-volatile memory 3, the address translation information LUT of the write unit can be updated.

As a result, the amount of data that can be recorded can be increased, and the sizes of unused regions in the data region DR and log region LR can be reduced. Therefore, when the write unit is written to the non-volatile memory 3, the region in which invalid data is recorded can be reduced, and the usage efficiency of the non-volatile memory 3 can be improved.

The allocation of the data region DR and the log region LR in the write unit is not limited to the examples shown in FIGS. 6A and 6B, each can be freely set according to the balance between the expected total size of data and the size of the compressed log information.

The controller 2 may perform a write process as shown in FIG. 7. FIG. 7 is a flowchart showing the write process.

Upon receiving a write command from the host 100, the controller 2 adds the entered data to the write unit. When the write unit is configured in the buffer memory 4, the controller 2 adds and temporarily stores the entered data to the region in which the write unit is configured, and performs size calculation processing (S2). In the size calculation processing, the data size and log size are calculated.

The controller 2 may perform the size calculation processing (S2) as shown in FIG. 8. FIG. 8 is a flowchart showing the flow of the size calculation processing. The controller 2 acquires the logical address of the write data (S11). When the log information LG is configured in the buffer memory 4, the controller 2 may update the log information LG by including the logical address of the entered data in the log information LG. Accordingly, the controller 2 calculates the data size and log size (S12).

For example, when the user data received from the host 100 has a variable length, the controller 2 adds the size of the entered data to the data size. The controller 2 configures the log information LG for the entered data, calculates the size of the log information LG after compression, and adds the compressed size to the log size.

Alternatively, when the controller 2 compresses the user data, the controller 2 adds the size of the compressed data to the data size of the entered data. The controller 2 configures the log information LG for the compressed data, calculates the size of the log information LG after compression, and adds the compressed size to the log size.

Alternatively, when the user data received from the host 100 is compressed data, the controller 2 adds the size of the entered compressed data to the data size. The controller 2 configures the log information LG for the compressed data, calculates the size of the log information LG after compression, and adds the compressed size to the log size.

The log size after compression may be calculated by executing compression to generate a compressed log and then calculating the compressed log, or by calculating only the compressed size without generating the compressed log.

When calculating with compression, the controller 2 compresses the log information LG and temporarily stores the compressed log information LG in the buffer memory 4. The controller 2 adds the size of the compressed log information LG to the log size.

When only the compressed size is calculated without generating the compressed log, the processing of compressing the log information LG may be delayed until immediately before the log information LG is transferred to the non-volatile memory 3 (immediately before S4).

Referring back to FIG. 7, the controller 2 compares the data size obtained in S2 with a first threshold and compares the log size obtained in S2 with a second threshold. The sum of the first threshold and the second threshold corresponds to the size that the controller 2 can write to the non-volatile memory 3 in parallel, and corresponds to the size of the write unit. The first threshold may be the size of the data region DR in the write unit. The second threshold may be the size of the log region LR in the write unit. When the data size is equal to or less than the first threshold and the log size is equal to or less than the second threshold (No in S3), the controller 2 returns the process to S2. When at least one of the data size exceeding the first threshold and the log size exceeding the second threshold is satisfied (Yes in S3), the controller 2 writes the write unit to the non-volatile memory 3 immediately before adding the last entry (S4). The controller 2 includes a plurality of pieces of data UD in the write unit immediately before adding the last entry. The controller 2 generates log information LG including the history of the plurality of pieces of data UD, compresses the log information LG, and includes the compressed log information LG in the write unit. The controller 2 writes the write unit to the non-volatile memory 3.

Here, when the upper limit of the number of entries of the data UD provided in the write unit is fixed to the second number (for example, 63), the upper limit of the number of log entries is also fixed to the second number, and it is possible to determine write start by confirming that the number of data entries reaches the upper limit.

On the other hand, in the write process shown in FIG. 7, the upper limit of the number of entries provided in the log information LG is variable. Therefore, the write start is determined by considering both when the total size of the data UD (data size) reaches the first threshold and when the size of the compressed log information LG (log size) reaches the second threshold. As a result, as shown in FIG. 6B, the memory system 1 can include a larger number of pieces of user data UD_0a to UD_N-1 than the second number in the data region in the write unit and can include the log information LG including the history of the larger number of pieces of user data than the second number in the log region in the write unit.

Figure 9:
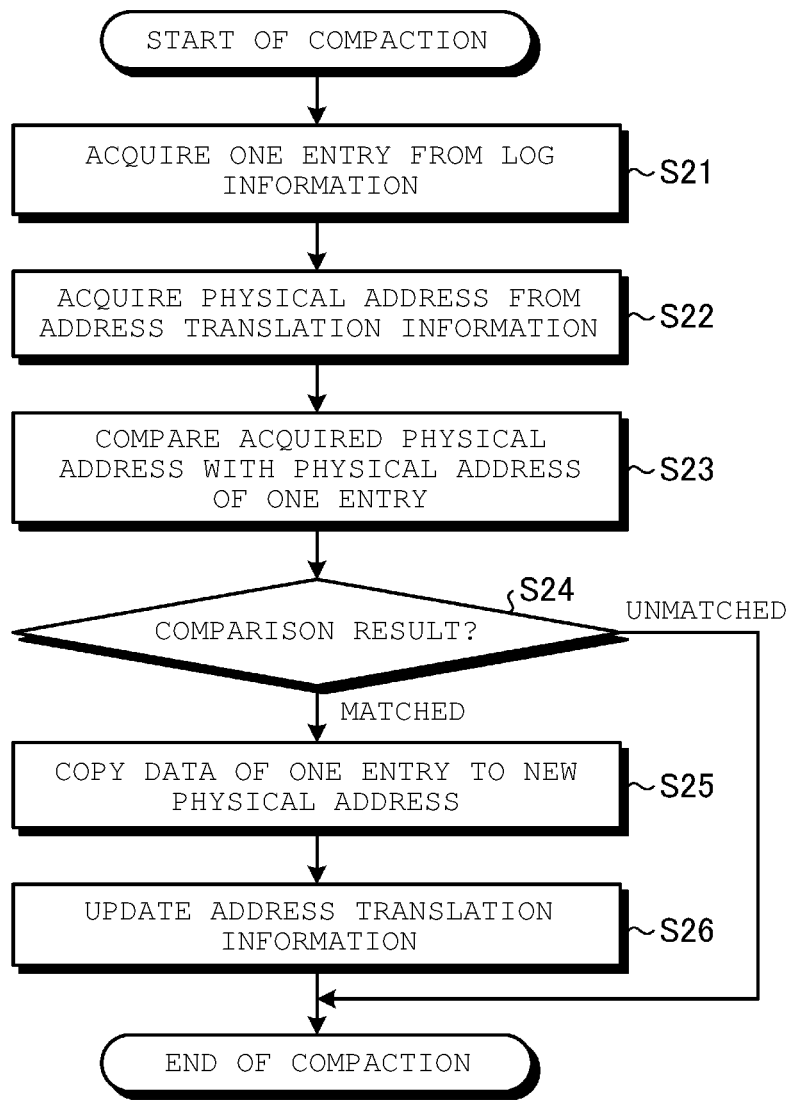
FIG. 9 is a flowchart showing compaction processing in the first embodiment.

The controller 2 may perform compaction processing as shown in FIG. 9 using the log information LG. FIG. 9 is a flowchart showing the compaction processing for one entry in log information LG. This compaction processing is repeatedly performed until all entries in log information LG are processed.

The controller 2 reads the log information from the non-volatile memory 3 and temporarily stores the read log information in the buffer memory 4 when it comes time to perform the compaction processing. The controller 2 decompresses the log information LG in the write unit and acquires uncompressed log information LG. The controller 2 acquires one entry from the log information LG on the buffer memory 4 (S21). One entry contains the logical address LBA. The controller 2 refers to the address translation information LUT on the buffer memory 4 and acquires the physical address MCA corresponding to the logical address LBA of one entry (S22). The controller 2 compares the physical address MCA acquired in S22 with the physical address MCA of one entry (S23). The controller 2 may obtain the physical address MCA of one entry by adding the physical offset to the physical address MCA of the first entry.

When the physical address MCA of S22 matches the physical address MCA of one entry ("matched" in S24), the controller 2 determines that the data of one entry is valid. Accordingly, the controller 2 newly copies the data of one entry to another physical location (S25). After copying, the controller 2 updates the corresponding entry in the address translation information LUT with the new physical address (S26).

However, the controller 2 does not update the address translation information LUT when the physical address recorded in the corresponding entry does not match the physical address of the copy source data in the compaction processing. Not matching means that new user data is written from the host 100 and updated during copying. The address translation information LUT may be updated when control is performed so that writing is not performed during copying.

When the physical address MCA of S22 does not match the physical address MCA of one entry ("unmatched" in S24), the controller 2 determines that the data of one entry is invalid. Accordingly, the controller 2 skips S25 and S26.

As described above, in the first embodiment, in the memory system 1, the number of entries in the write unit is made variable, and the log information LG is compressed and provided in the write unit. For example, the memory system 1 keeps adding the data entries until the total size of the data UD (data size) exceeds the size of the data region DR or the size of the compressed log information LG (log size) exceeds the size of the log region LR. Then, the memory system 1 finishes adding the data entries immediately before the data size exceeds the size of the data region DR or immediately before the log size exceeds the size of the log region LR. As a result, a larger number of pieces of user data can be provided in the data region DR within the write unit than in the case where the number of entries in the write unit is fixed to a predetermined number, and the log information LG including the history of the larger number of pieces of user data can be provided in the log region LR in the write unit. As a result, the amount of data that can be recorded can be increased, and the sizes of unused regions in the data region DR and the log region LR can be reduced. Therefore, when the write unit is written to the non-volatile memory 3, the region in which invalid data is recorded can be reduced, and the usage efficiency of the non-volatile memory 3 can be improved.

A data structure of the log information LG is not limited to the structure shown in FIG. 5 and may take any structure that can acquire the physical address of one entry in the compaction processing shown in FIG. 9.

For example, the data structure of the log information LG may be a structure in which data lengths and logical addresses are correlated with a plurality of logical addresses. In this case, the controller 2 can obtain the data length from the first entry in the write unit to the corresponding entry by referring to the log information LG. Therefore, the controller 2 can acquire the first physical address of the write unit, and acquire the physical address of the corresponding entry according to the physical address of the first entry of the write unit and the data length from the first entry to the corresponding entry.

Alternatively, the data structure of the log information LG may be a structure in which physical addresses and logical addresses are correlated with the plurality of logical addresses. In this case, the controller 2 can acquire the physical address of the corresponding entry by referring to the log information LG.

Figure 13:
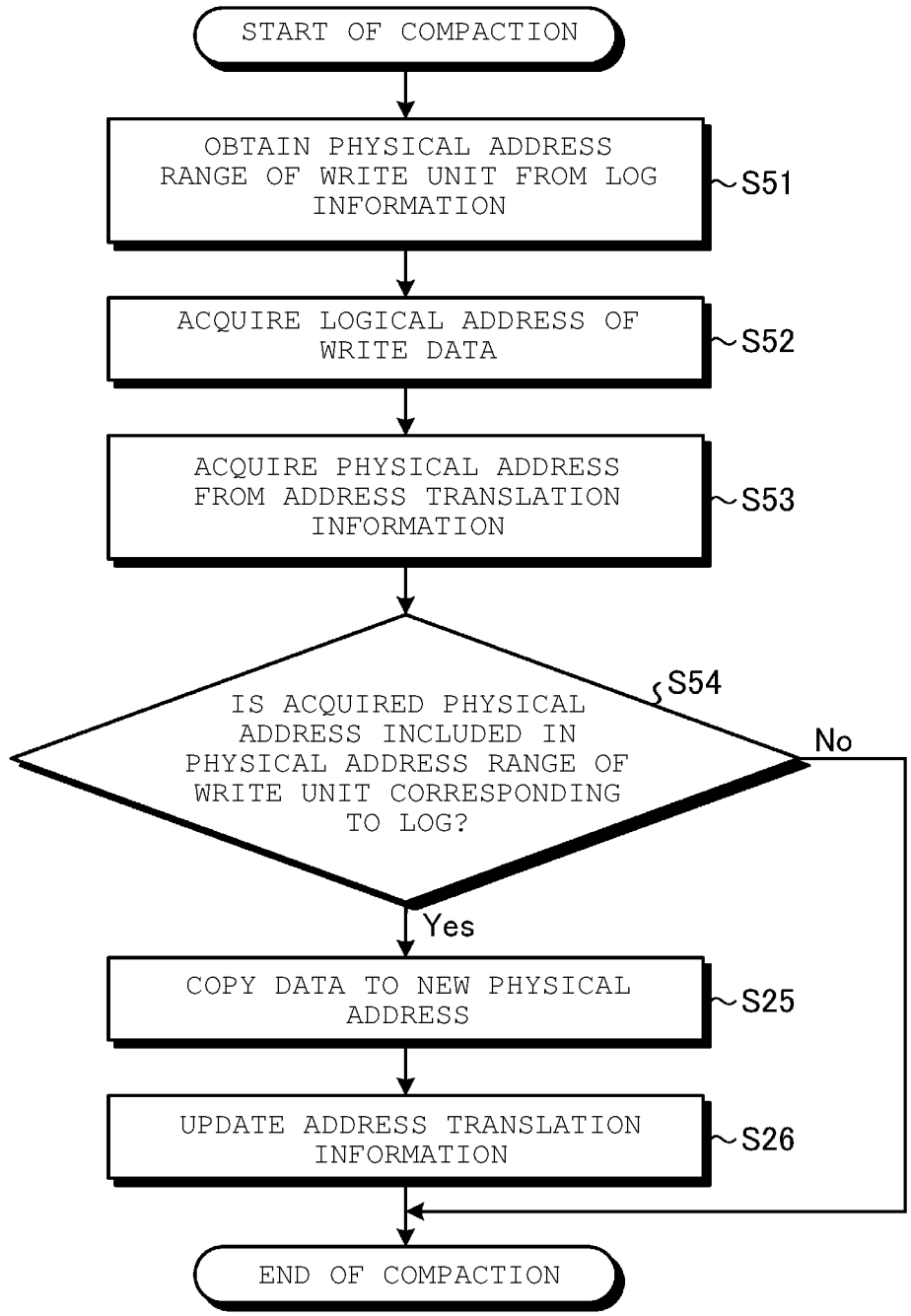
FIG. 13 is a flowchart showing compaction processing in the third embodiment.

Alternatively, the compaction processing shown in FIG. 13 may be applied instead of the compaction processing shown in FIG. 9 without calculating the physical address from the log information LG. The compaction processing shown in FIG. 13 will be described later.

Second Embodiment

Next, a memory system according to a second embodiment will be described. The following description will be made focusing on the parts that are different from the first embodiment.

The first embodiment is an example of performing the size calculation processing (S2) when compressing the log information LG by any lossless compression method. The second embodiment is an example of performing the size calculation processing (S2) when compressing the log information LG by a compression method considering the access property to the non-volatile memory 3. This compression method is also the lossless compression method.

In the second embodiment, a compression algorithm dedicated to logs is used. In general, writing to the memory system 1 has a high probability of sequential access, so a log compression method that expects the sequential access is effective. In the second embodiment, as a method for expecting the sequential access, a compression method is used in which the size of the code when the prediction of the next logical address is correct is smaller than the size of the code when the prediction is incorrect. This compression method is referred to as a predictive coding compression method. In the predictive coding compression method, for example, the current logical address is predicted from the previous logical address, and when the prediction is correct, a short code "1" is assigned. When the prediction is incorrect, the current logical address is assigned with "0".

Figure 10:
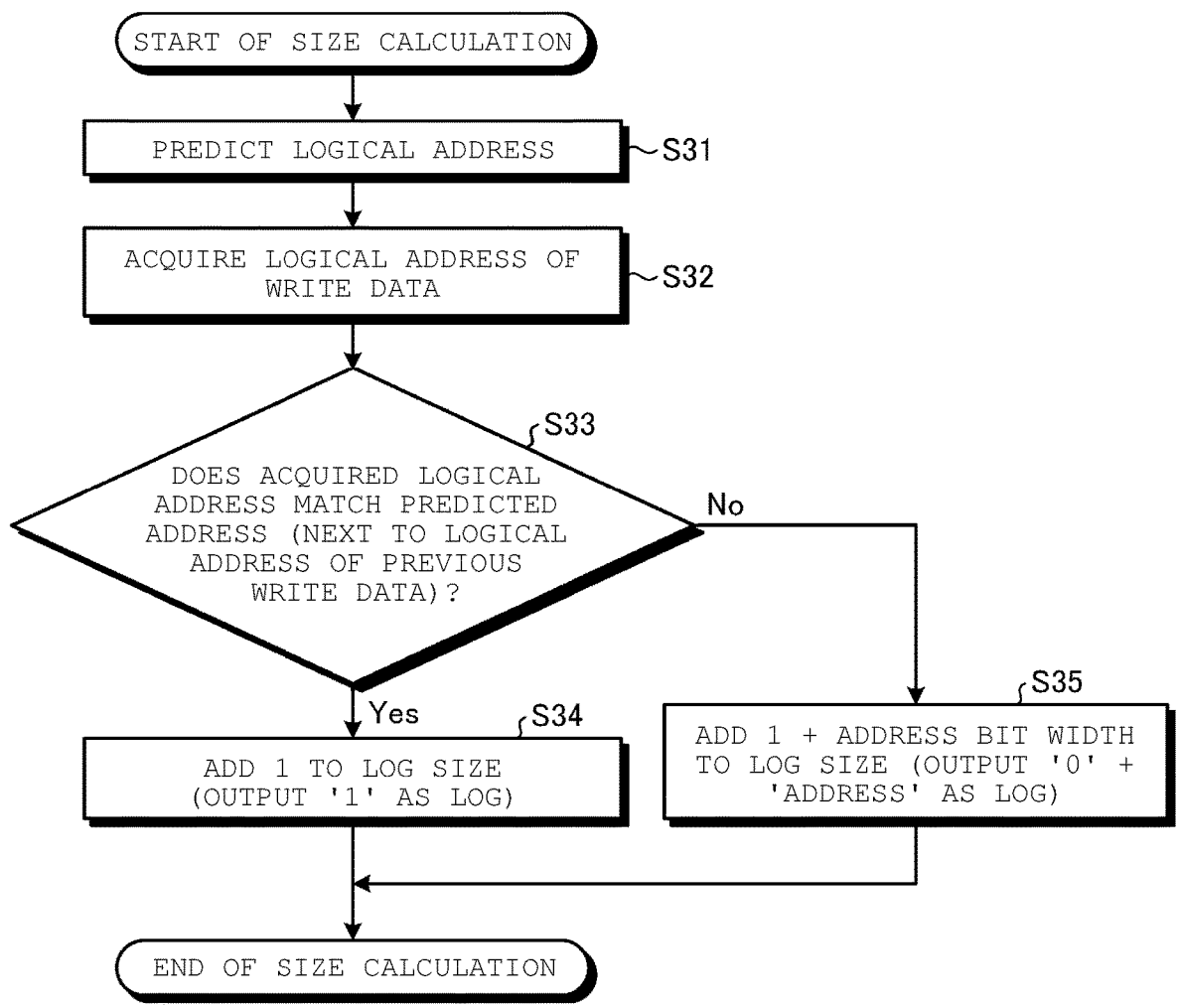
FIG. 10 is a flowchart showing size calculation processing in a second embodiment.

In this case, in the size calculation processing (S2), as shown in FIG. 10, the process different from the first embodiment is performed in the following respects. FIG. 10 is a flowchart showing the flow of the size calculation processing (S2).

The controller 2 predicts the logical address to be acquired next (S31). If there is a logical address acquired in the previous size calculation processing (S2), the controller 2 may predict the next logical address based on that logical address. For example, the controller 2 may predict an address obtained by incrementing the previously acquired logical address as the next logical address. If there is no logical address acquired in the previous size calculation processing (S2), the controller 2 may refer to the address translation information LUT and predict the logical address of the cluster to be processed as the next logical address.

The controller 2 acquires the logical address of the entered data (S32). The controller 2 determines whether the acquired logical address matches the predicted logical address (S33). The controller 2 compares the logical address acquired in S32 with the logical address predicted in S31. When the acquired logical address matches the predicted logical address (Yes in S33), the controller 2 encodes and compresses the log information LG with a code "1" indicating that the prediction is correct, and 1 is added to the log size (S34).

When the acquired logical address does not match the predicted logical address (No in S33), the controller 2 encodes and compresses the log information LG with the code "0" indicating that the prediction is incorrect and the logical address, and (1+B) is added to the log size (S35). B indicates a bit width of the logical address.

The controller 2 may delay the processing of compressing the log information LG until immediately before transferring the log information LG to the non-volatile memory 3 (immediately before S4).

As described above, in the second embodiment, since one log size calculation can be achieved by one address comparison in the memory system 1, the processing time for log size calculation can be shortened.

Also, in the second embodiment, in the memory system 1, the log information LG is compressed using a compression method considering the high probability of sequential access. This makes it possible to easily improve a compression ratio of the log information LG.

Third Embodiment

Next, a memory system according to a third embodiment will be described. The following description will be made focusing on the parts that are different from the first and second embodiments.

In the second embodiment, the compression ratio of the log information LG is improved by using the compression method that considers sequential access. In the third embodiment, the compression ratio is further improved by devising processing. In other words, a compression method is used in consideration of sequential access in a state where the log information LG is sorted using the logical address LBA as a key, and the sequentiality is enhanced. As a result, an improvement in compression ratio can be expected.

Figure 11:
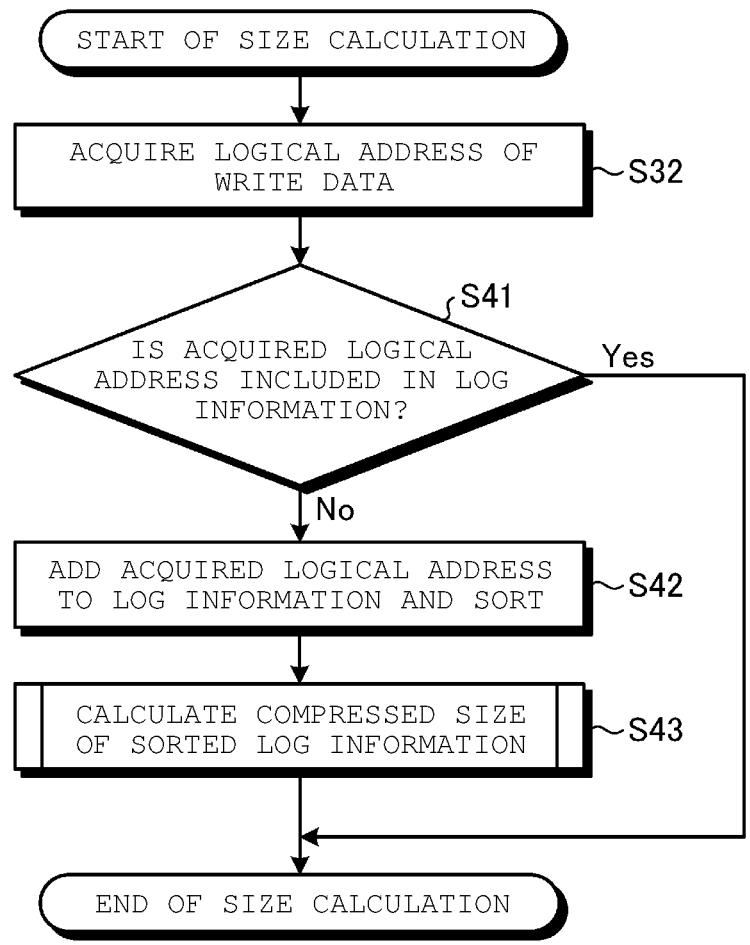
FIG. 11 is a flowchart showing size calculation processing in a third embodiment.

In this case, in the size calculation processing (S2), as shown in FIG. 11, the process different from that of the second embodiment is performed in the following respects. FIG. 11 is a flowchart showing the flow of the size calculation processing (S2).

After performing the process of S32 as in the second embodiment, the controller 2 checks whether the logical address LBA acquired in S32 is already provided in the log information LG (S41).

When the logical address LBA acquired in S32 is already provided in the log information LG (Yes in S41), the controller 2 ends the processing without adding anything to the log information LG. That is, the controller 2 adds zero to the log size.

When the logical address LBA acquired in S32 is not provided in the log information LG (No in S41), the controller 2 adds the logical address LBA to the log information LG and sorts the log information LG using the logical address LBA as a key (S42). The controller 2 calculates the compressed size of the sorted log information LG (S43).

Figure 12:
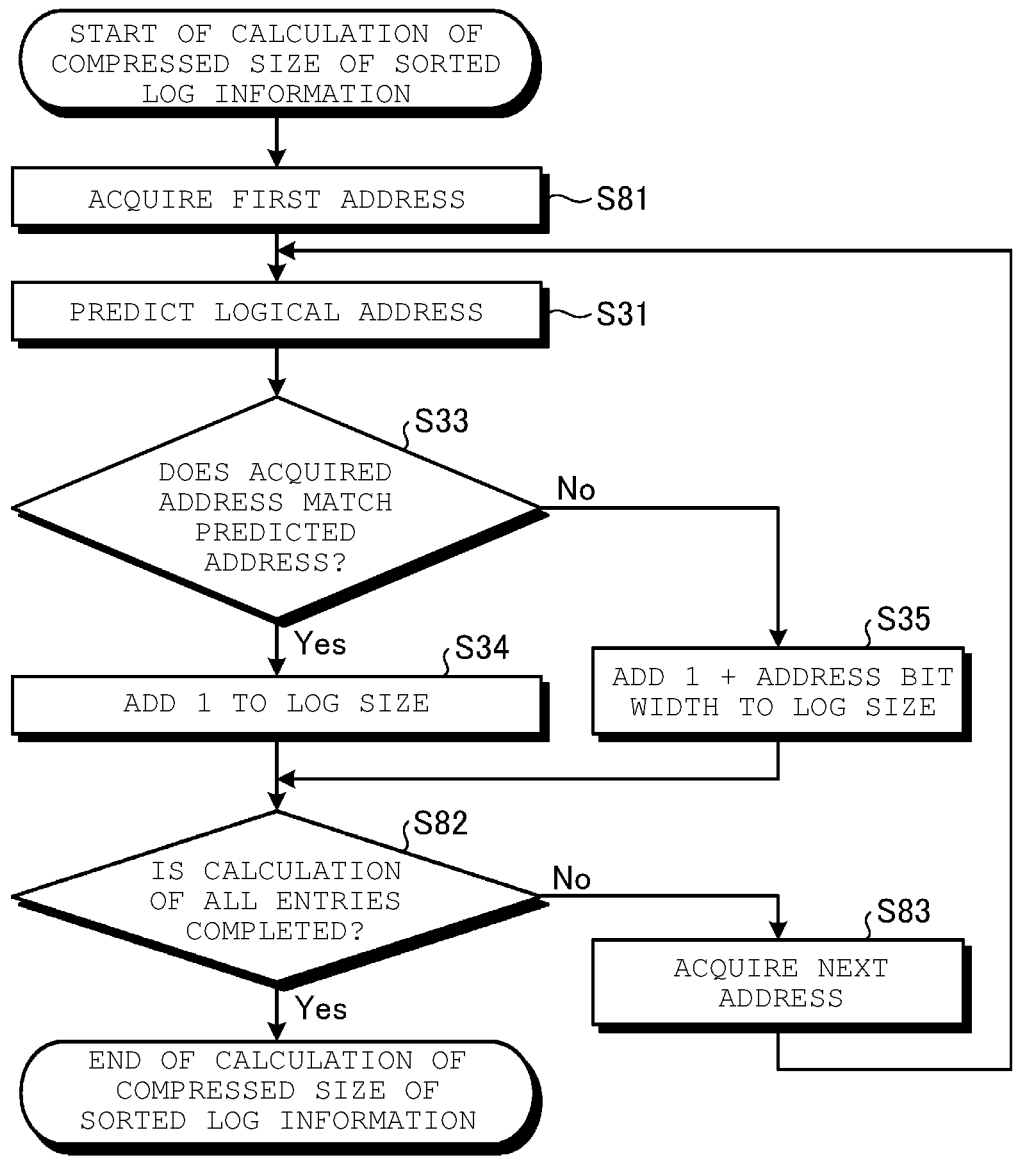
FIG. 12 is a flowchart showing compressed size calculation processing of sorted log information in the third embodiment.

In the compressed size calculation (S43) of the sorted log information LG, the processing shown in FIG. 12 may be performed. The controller 2 acquires the logical address of the first entry from the log information LG (S81). After predicting the logical address to be acquired next (S31), the controller 2 performs the processes of S33 to S35 in the same manner as in the second embodiment. After that, the controller 2 acquires the logical address of the next entry (S83) until the calculation is completed for all sorted entries (No in S82), and repeats the processes of S33 to S35 as in the second embodiment. The controller 2 finishes the processing when the calculation is completed for all the entries (Yes in S82). As a result, the controller 2 can perform calculations similar to S33 to S35 in FIG. 10 for all logical addresses provided in the log information LG, for example.

In the size calculation processing (S2) shown in FIGS. 11 and 12, since sorting can be performed each time the log size is calculated, the processing time may increase, but an improvement in the compression ratio can be expected.

Also, the controller 2 may perform compaction processing as shown in FIG. 13 using the log information LG. FIG. 13 is a flowchart showing compaction processing for one entry in log information LG. This compaction processing is repeatedly performed until all entries in log information LG are processed.

The controller 2 reads the log information and temporarily stores the read log information in the buffer memory 4 when it comes time to perform the compaction processing. The controller 2 decompresses the log information LG in the write unit and acquires uncompressed log information LG.

Here, since each entry in the log information LG is sorted, when the logical address LBA is acquired from the log information LG, it is not known where the corresponding data is recorded in the write unit. Therefore, the controller 2 acquires a physical address range of the write unit (S51).

Also, the controller 2 acquires the logical address LBA of the entered data (S52).

The controller 2 refers to the address translation information LUT and acquires the physical address MCA corresponding to the acquired logical address LBA (S53).

The controller 2 determines whether the physical address MCA acquired in S53 is provided in the physical address range acquired in S51 (S54).

When the physical address MCA is provided in the physical address range (Yes in S54), the controller 2 determines that the data recorded in the physical address MCA is valid. After the determination, the controller 2 copies the data (S25) and updates the address translation information (S26), as in the first embodiment.

In the second embodiment, it is expected that there is a high possibility that data is written to the consecutive logical addresses LBA in order. In the third embodiment, it is not necessary for data to be written to the consecutive logical addresses LBA in order. When data is written to the consecutive logical addresses LBA without gaps in a short period of time, the logical addresses LBA are in a state of being consecutive after sorting, and thus, compression can be effectively performed by the method shown in the second embodiment. In other words, an improvement in the compression ratio of the log information LG can be expected in more cases.

When the physical address MCA is not provided in the physical address range (No in S54), the controller 2 determines that the data of one entry is invalid. Accordingly, the controller 2 skips S25 and S26.

The controller 2 may delay the processing of compressing the log information LG until immediately before transferring the log information LG to the non-volatile memory 3 (immediately before S4).

As described above, in the third embodiment, in the memory system 1, the compression method is used in which the sequential access to the log information LG is considered in the state where the log information LG is sorted using the logical address LBA as a key to enhance the sequentiality. As a result, an improvement in compression ratio can be expected.

Fourth Embodiment

Next, a memory system according to a fourth embodiment will be described. The following description will be made focusing on the parts that are different from the first to third embodiments.

In the first to third embodiments, the log information LG is compressed using a lossless compression method. In the fourth embodiment, the log information LG is compressed using a lossy compression method. This is expected to further improve the compression ratio.

As a lossy compression method, a compression method is adopted in which the complete logical addresses of user data are not recorded in the write unit. As an example, FIG. 14 shows a compression method in which the lower M bits of the logical address of B bits can be deleted and the upper (B-M) bits of the logical addresses of user data are recorded in the log information LG.

Figure 14:
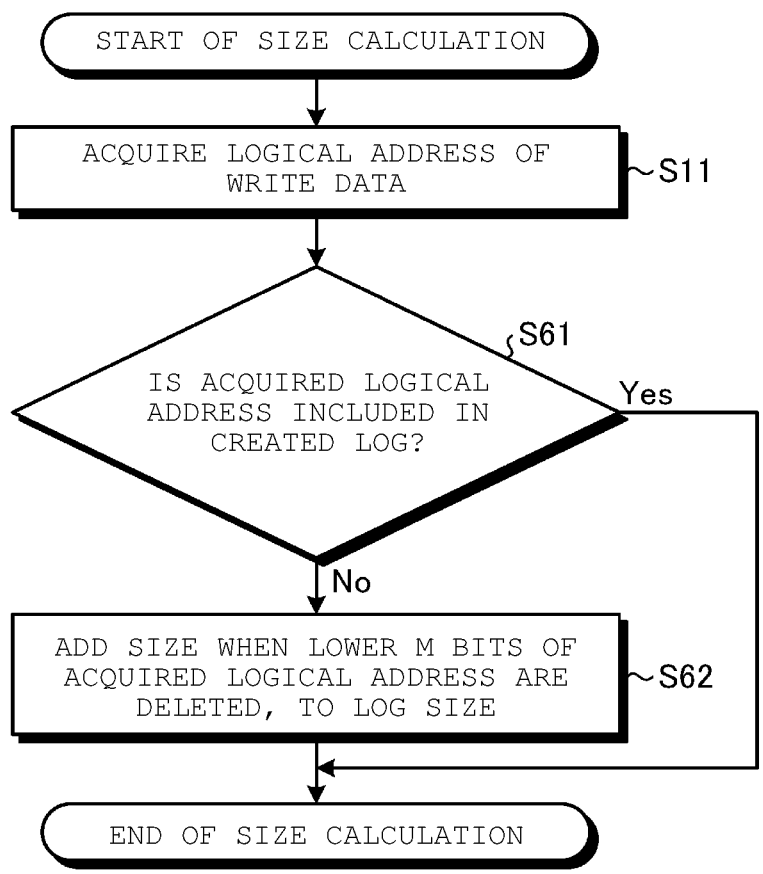
FIG. 14 is a flowchart showing size calculation processing in a fourth embodiment.

In this case, in the size calculation processing (S2), as shown in FIG. 14, the process different from those in the first to third embodiments is performed in the following respects. FIG. 14 is a flowchart showing the flow of the size calculation processing (S2).

The controller 2 acquires the logical address of the entered data (S11) and determines whether the upper (B-M) bits of the acquired logical address is provided in the current log information LG (S61). The current log information LG indicates the log information LG currently stored in the buffer memory 4.

When the upper (B-M) bits of the acquired logical address is already provided in the log information LG (Yes in S61), the controller 2 ends the processing without changing the log information LG.

When the upper (B-M) bits of the acquired logical address is not provided in the log information LG (No in S61), the controller 2 deletes the lower M bits of the acquired logical address, adds the upper (B-M) bits of the logical address to the log information LG, and adds the size (B-M) to the log size (S62). B is the bit width of the logical address. M is any integer greater than or equal to 2 and less than B.

The compression method shown in FIG. 14 can reduce at least the log size by M bits per entry. This makes it possible to further improve the compression ratio of the log information LG and further reduce the log size compared to the second and third embodiments.

The controller 2 may delay the processing of compressing the log information LG until immediately before transferring the log information LG to the non-volatile memory 3 (immediately before S4).

Also, in the log information LG, one entry is a logical address compressed to a bit width (B-M), and a maximum of $2^M$ logical addresses can be represented by one entry. Instead, the compression method shown in FIG. 14 is a lossy compression method. Therefore, the $2^M$ logical addresses may include logical addresses corresponding to data not recorded in the write unit.

Figure 15:
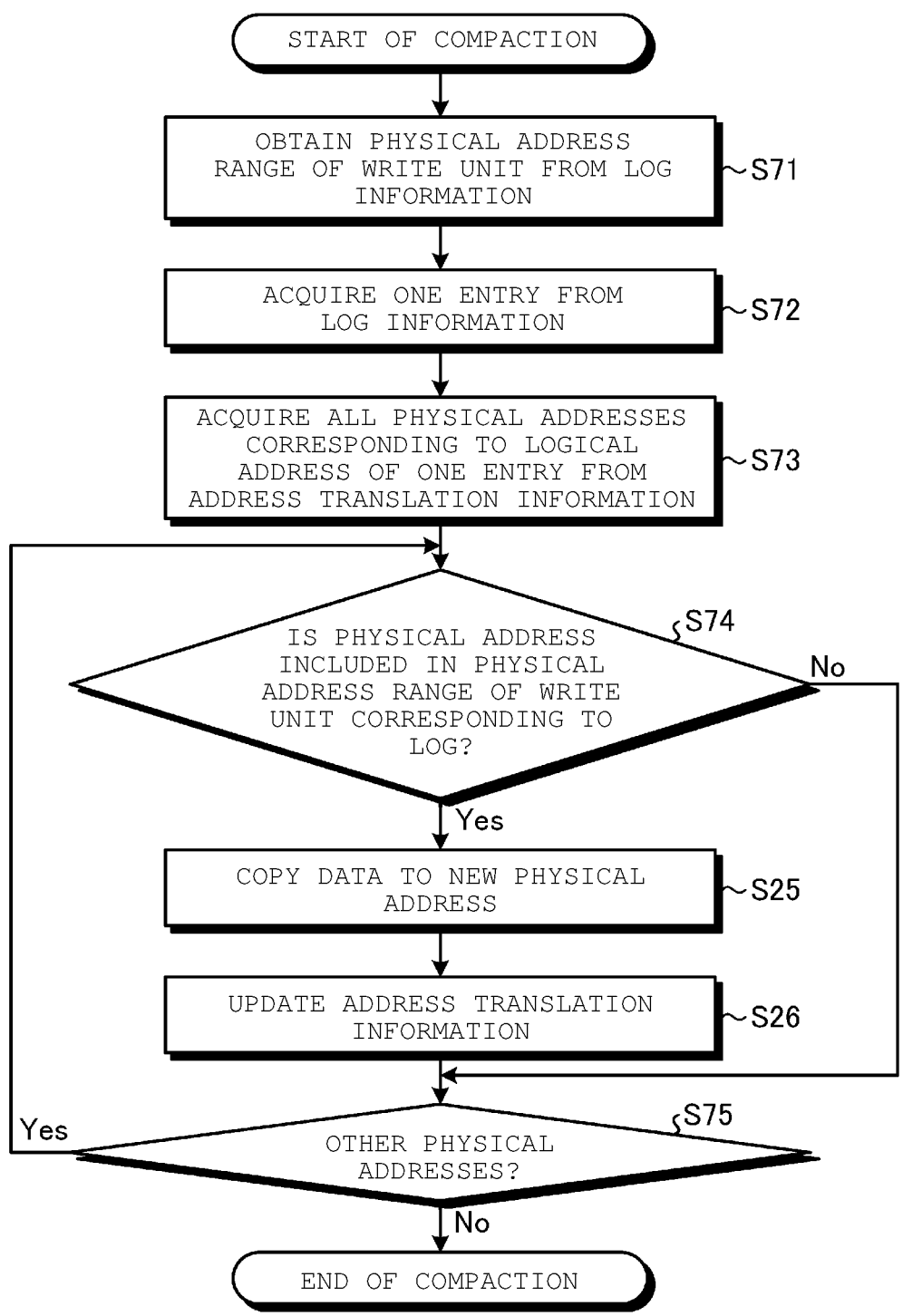
FIG. 15 is a flowchart showing compaction processing in the fourth embodiment.

Taking this into consideration, the controller 2 may perform compaction processing as shown in FIG. 15 using the log information LG. FIG. 15 is a flowchart showing compaction processing for one entry in log information LG. This compaction processing is repeatedly performed until all entries in log information LG are processed.

The controller 2 reads the log information and temporarily stores the read log information in the buffer memory 4 when it comes time to perform the compaction processing. The controller 2 decompresses the log information LG in the write unit and acquires uncompressed log information LG.

The controller 2 obtains the physical address range of the write unit (S71).

The controller 2 acquires one entry from the log information LG (S72). The one entry is a logical address compressed to the bit width (B-M) and represents $2^M$ logical addresses LBA. The controller 2 acquires all ($2^M$ or less) physical addresses MCA corresponding to the logical addresses compressed to the bit width (B-M) from the address translation information LUT (S72). The controller 2 performs the processes of S74 to S75 for each of all acquired physical addresses MCA.

The controller 2 selects one physical address MCA from all the physical addresses MCA acquired in S73. The controller 2 determines whether the selected physical address MCA is provided in the physical address range obtained in S71 (S74).

When the selected physical address MCA is provided in the physical address range (Yes in S74), the controller 2 determines that the data recorded in the physical address MCA is valid. After the determination, the controller 2 copies the data (S25) and updates the address translation information LUT (S26), as in the first embodiment.

When the selected physical address MCA is not provided in the physical address range (No in S74), the controller 2 determines that one entry of data is invalid. Accordingly, the controller 2 skips S25 and S26.

The controller 2 determines whether there are unselected physical addresses MCA among all the physical addresses MCA acquired in S73 (S75). When there is another unselected physical address MCA (Yes in S75), the controller 2 selects the other unselected physical address MCA and returns the process to S74. When there is no other unselected physical address MCA (No in S75), the controller 2 ends the processing.

In the compaction processing of FIG. 15, since a plurality of ($2^M$ or less) logical address determinations are executed for each log entry, the amount of processing may increase, and in the most pessimistic case, the number of determinations will be $2^M$. However, the impact on performance can be reduced by appropriately designing the number of logical addresses that can be expressed per entry (that is, the number of bits M to be reduced in S62).

As described above, in the fourth embodiment, since the log information LG is compressed using a lossy compression method, the compression ratio of the log information LG can be further improved.

In a typical configuration of the memory system 1, the controller 2 stores the address translation information LUT in the buffer memory 4 (for example, DRAM). The access granularity of the buffer memory 4 (for example, DRAM) is usually larger than the access granularity of the buffer memory 23 (for example, SRAM). For example, depending on the configuration, the access granularity of the buffer memory 4 may be 256 bytes or more. In other words, the throughput of the address translation process (the number of accesses per unit time) may not change even if the access granularity of the buffer memory 4 is 4 bytes or 256 bytes per access to the address translation information LUT by the controller 2.

Using this property, the layout of the address translation information LUT and the bit reduction number M of S62 may be designed so that the total size of a plurality of ($2^M$ or less) logical addresses corresponding to one entry falls in the range (for example, 256 bytes) of one access of the buffer memory 4 (for example, DRAM). In this case, since one access to the address translation information LUT for one entry in the log information LG is sufficient, even if the number of determinations in the compaction processing increases from 1 to $2^M$, the amount of access to the address translation information LUT can be reduced in the same way as when the number of determinations is one. As a result, the circuit size of the buffer interface 25 can be reduced to the same level as when the number of determinations is one.

Further, the logical address comparison processing of the present embodiment only needs to be executed with performance that matches the transfer speed of the buffer memory 4 (for example, DRAM) and the buffer interface 25, and the impact on performance and area can be minimized by designing appropriately.

In FIG. 14, in order to simplify the description, a value obtained by deleting the lower M bits of the logical address LBA is used as one entry of the log information, and a configuration corresponding to a plurality ($2^M$ or less) of logical addresses LBA corresponding to one entry is given as an example. However, another method may be used as long as the logical address LBA can be obtained from one entry of the log information. For example, the quotient obtained by dividing the logical address LBA by the default value D may be recorded in the log information LG. In this case, in the log information LG, a plurality of (D or less) logical addresses LBA can be represented by logical addresses compressed to a (B/D) bit width. When the controller 2 is designed so that a plurality of (D or less) logical addresses LBA corresponding to one entry fall in the range of one access of the buffer memory 4 (for example, DRAM), the impact on the performance of the address translation process can be reduced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory;
a buffer memory; and
a controller configured to write data to the non-volatile memory in write units of a predefined size, each write unit including a plurality of data items and log data for the write unit, wherein the controller is further configured to:
temporarily store the data items and the log data of each write unit in the buffer memory prior to writing the write unit to the non-volatile memory, and
in response to a write command, store write data specified in the write command and log information associated with the write data in the buffer memory, calculate a total data size by adding a data size of the write data to a data size of the data items in the write unit temporarily stored in the buffer memory and a total log size by adding a data size of the log information to a data size of the log data in the write unit temporarily stored in the buffer memory, and in response to determining that either the total data size is greater than a first threshold or the total log size is greater than a second threshold, write the write unit temporarily stored in the buffer memory to the non-volatile memory, and
the controller is further configured to predict a logical address of the write data based on a logical address of a most recent data item added to the write unit, and determine the data size of the log information based on whether or not the logical address of the write data matches the predicted logical address.

2. The memory system according to claim 1, wherein a sum of the first threshold and the second threshold is smaller than a maximum size of data that the controller can write to the non-volatile memory in parallel.

3. The memory system according to claim 1, wherein at least two of the data items in the write unit written out to the non-volatile memory have different data sizes.

4. The memory system according to claim 3, wherein the log data of the write unit includes log information for each of the data items in the write unit.

5. The memory system according to claim 4, wherein the log information for at least two of the data items in the write unit have different data sizes.

6. The memory system according to claim 1, wherein the controller is further configured to:
in response to determining that neither the total data size is greater than the first threshold nor the total log size is greater than the second threshold, add the write data to the write unit temporarily stored in the buffer memory as one of the data items and add the log information to the log data of the write unit.

7. The memory system according to claim 1, wherein the data size of the log information is determined to be a first data size if the logical address of the write data matches the predicted logical address and a second data size greater than the first data size if the logical address of the write data does not match the predicted logical address.

8. A memory system comprising:
a non-volatile memory;
a buffer memory; and
a controller configured to write data to the non-volatile memory in write units of a predefined size, each write unit including a plurality of data items and log data for the write unit, wherein the controller is further configured to:
temporarily store the data items and the log data of each write unit in the buffer memory prior to writing the write unit to the non-volatile memory, and
in response to a write command, store write data specified in the write command and log information associated with the write data in the buffer memory, calculate a total data size by adding a data size of the write data to a data size of the data items in the write unit temporarily stored in the buffer memory and a total log size by adding a data size of the log information to a data size of the log data in the write unit temporarily stored in the buffer memory, and in response to determining that either the total data size is greater than a first threshold or the total log size is greater than a second threshold, write the write unit temporarily stored in the buffer memory to the non-volatile memory, and
the controller is further configured to:
set the data size of the log information to be zero if a logical address of the write data is included in a logical address range indicated by the log data, and
determine the data size of the log information using upper bits of the logical address of the write data if the logical address of the write data is not included in the logical address range indicated by the log data.

9. The memory system according to claim 8, wherein the controller is further configured to:
acquire a first physical address corresponding to data of a first logical address included in the logical address range indicated by the log data from address translation information,
determine whether the first physical address is provided in a physical address range specified by the log data, and
copy the data stored at the first physical address to a second physical address and update the address translation information to associate the first logical address to the second physical address when the first physical address is provided in the physical address range.

10. A memory system comprising:
a non-volatile memory;
a buffer memory; and
a controller configured to write data to the non-volatile memory in write units of a predefined size, each write unit including a plurality of data items and log data for the write unit, wherein the controller is further configured to:
temporarily store the data items and the log data of each write unit in the buffer memory prior to writing the write unit to the non-volatile memory, and
in response to a write command, store write data specified in the write command and log information associated with the write data in the buffer memory, calculate a total data size by adding a data size of the write data to a data size of the data items in the write unit temporarily stored in the buffer memory and a total log size by adding the log information to the log data, sorting the log data with the added log information, and calculating a data size of the sorted log data, and in response to determining that either the total data size is greater than a first threshold or the total log size is greater than a second threshold, write the write unit temporarily stored in the buffer memory to the non-volatile memory,
the log data includes a plurality of log information, each of which is associated with one of the data items of the write unit, and the log data are sorted based on logical addresses of the data items,
the data size of the sorted log data is equal to a sum of data sizes of all of the log information, and
if logical addresses associated with any first and second log information that are consecutively arranged in the sorted log data, are sequential, the data size of the second log information is set to 1, and if not, the data size of the second log information is set to 1+bit width of the logical address associated with the second log information.

11. The memory system according to claim 10, wherein a sum of the first threshold and the second threshold is smaller than a maximum size of data that the controller can write to the non-volatile memory in parallel.

12. The memory system according to claim 10, wherein at least two of the data items in the write unit written out to the non-volatile memory have different data sizes.

13. The memory system according to claim 12, wherein the log data of the write unit includes log information for each of the data items in the write unit.

14. The memory system according to claim 13, wherein the log information for at least two of the data items in the write unit have different data sizes.

15. The memory system according to claim 10, wherein the controller is further configured to:
in response to determining that neither the total data size is greater than the first threshold nor the total log size is greater than the second threshold, add the write data to the write unit temporarily stored in the buffer memory as one of the data items and add the log information to the log data of the write unit.

* * * * *